(No Model.)
F. H. SLEEPER.
SCREW JACK.
No. 479,850. Patented Aug. 2, 1892.
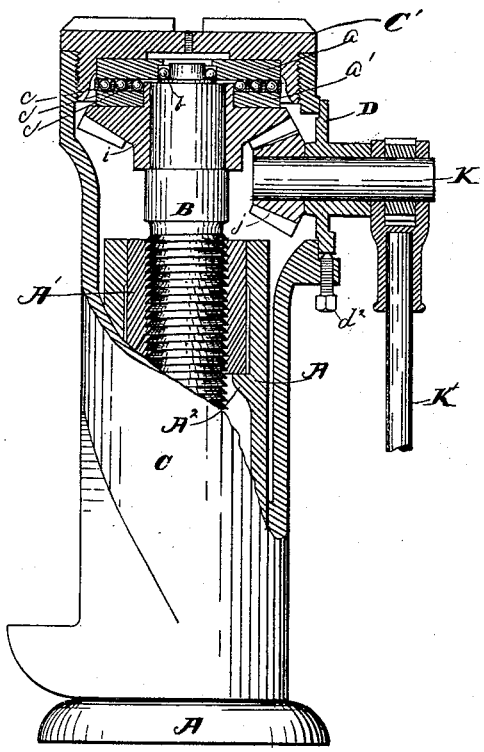
Fig. 1
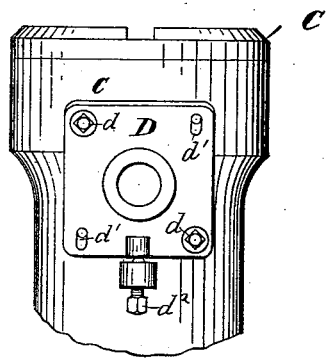
Fig. 2.
Fig. 3.
Witnesses,
A. O. Norton
Inventor,
Francis H. Sleeper

UNITED STATES PATENT OFFICE.

FRANCIS H. SLEEPER, OF WATERVILLE, ASSIGNOR TO ARTHUR OSMORE NORTON, OF COATICOOK, CANADA.

SCREW-JACK.

SPECIFICATION forming part of Letters Patent No. 479,850, dated August 2, 1892.

Application filed September 30, 1889. Renewed January 21, 1892. Serial No. 418,747. (No model.)

*To all whom it may concern:*

Be it known that I, FRANCIS H. SLEEPER, a subject of the Queen of England, residing at Waterville, in the county of Compton, in the Province of Quebec, Canada, have invented certain new and useful Improvements in Screw-Jacks, of which the following is a specification.

My invention is designed as an improvement upon the screw-jack invented by Henry Binsse, and for which he received a patent August 28, 1883, No. 283,851.

The objects of my invention are to lessen the friction from the thrust of the screw and thus increase the lifting power of the jack, and to provide means for adjusting the gears to mesh properly. I accomplish these objects by means of the mechanism illustrated in the accompanying drawings, in which similar letters refer to similar parts throughout the several views.

Figure 1 is a side elevation of the improved jack with a portion of the side cut away to show the working parts in section. Fig. 2 is a detail of cap D, showing manner of securing and adjusting the same upon the sleeve C. Fig. 3 is a top view of steel plate $a'$ with rings $c\ c\ c$ lying in position upon it.

A represents a stationary stand having a removable nut $A'$, (preferably of phosphor-bronze,) fitted within it and resting upon a shoulder $A^2$. The screw B fits the nut $A'$ and carries upon its upper end a gear $i$, which is made fast upon it. The sleeve C is bored to fit the stand A and has a head $C'$ screwed into its upper end or made fast by any suitable means. The head $C'$ of sleeve C rests upon a hardened steel plate or washer $a$. A hardened steel plate or washer $a'$ encircles the hub of the gear $i$ and rests upon the body of the said gear. Between the plates $a\ a'$ are placed several circular trains of hardened steel balls, which are kept in place by rings $c\ c\ c$ and act as a thrust-bearing between the screw B and the head of sleeve C. A train of hardened steel balls $l$ is placed about the end of the screw B in the annular space between the screw and the inside of plate $a$, the end of screw B being turned to a suitable size. The train of balls $b$, in conjunction with their retaining plate or washer $a$, acts as a frictionless bearing for the end of the screw within the head of the sleeve C.

The gear $j$ upon the shaft K engages the gear $i$ to turn it within the sleeve C, and is operated from a lever $K'$ by means of an ordinary reversible ratchet. The spindle or shaft K has its bearing in a hub made upon the cap D, which is secured to the sleeve C by screws $d$, passed through slots $d'$ in the said cap. An adjusting-screw $d^2$ is provided to raise the cap D to bring the gear $j$ into mesh with the gear $i$.

What I claim as my invention, and desire to secure by Letters Patent, is—

1. The combination of the stand and screw and means for revolving said screw with the sleeve C, provided with a head having a bearing for said screw, composed of a plate, and a train of balls interposed between said plate and the screw for sustaining said screw against lateral displacement, substantially as described.

2. The combination of the stand and the screw and means for rotating the said screw with the sleeve and its head, plates $a\ a'$, a number of concentric rings interposed between said plates, and trains of balls arranged between the plates and rings, substantially as described, and for the purpose set forth.

3. The combination, with the stand, screw B, sleeve C, head $C'$, plate $a$, and trains of steel balls $b$, and mechanism for turning the screw, of the plate $a'$, rings $c\ c\ c$, and the trains of steel balls filling the annular spaces between the said rings, substantially as described, and for the purpose set forth.

4. The combination of the stand, screw, nut in said stand through which the screw is raised and lowered by axial rotation therein, means to rotate the screw, a sleeve carried by the screw, a head applied to said sleeve, a bearing for said screw in said head, and a train of balls interposed laterally immediately between the end of the screw and the bearing in the head, substantially as described.

5. The combination, with the stand A, screw B, sleeve C, having a head, and means, substantially as described, for revolving the screw within the said sleeve, of the cap D and adjusting-screw $d^2$, substantially as and for the purpose set forth.

FRANCIS H. SLEEPER.

Witnesses:
A. O. NORTON,
JNO. FRASER.